United States Patent [19]
McCredie

[11] Patent Number: 5,979,152
[45] Date of Patent: *Nov. 9, 1999

[54] CUTTERBAR ASSEMBLY FOR A RECIPROCATING MOWER

[75] Inventor: Paul John McCredie, Milan, Ill.

[73] Assignee: Deere & Company, Moline, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/841,703

[22] Filed: Apr. 30, 1997

Related U.S. Application Data

[63] Continuation of application No. 08/841,703, Apr. 30, 1997.

[51] Int. Cl.⁶ .................................................. A01D 34/18
[52] U.S. Cl. .............................. 56/298; 56/307; 56/308; 56/DIG. 20
[58] Field of Search ............................. 56/298, 299, 303, 56/305, 307, 308, 310, 320.1, DIG. 20, DIG. 24

[56] References Cited

U.S. PATENT DOCUMENTS

| 922,291 | 5/1909 | Kibbe | 56/298 |
| 2,654,987 | 10/1953 | Mills et al. | 56/298 |
| 3,600,880 | 8/1971 | Woods et al. | 56/298 |
| 4,012,891 | 3/1977 | Steuerwald | 56/305 |
| 4,519,192 | 5/1985 | Oppenhuisen et al. | 56/298 |
| 4,644,738 | 2/1987 | Krambeck et al. | 56/259 |

FOREIGN PATENT DOCUMENTS

| 687487 | 1/1940 | Germany | 56/305 |

Primary Examiner—H. Shakelford

[57] ABSTRACT

The non-driving end of the cutterbar is provided with a specialized integral end guard section having a single guard and a body portion defining a slot for enclosing the reciprocating end knife section. The body portion is also provided with a rearwardly extending mounting portion.

1 Claim, 3 Drawing Sheets

CUTTERBAR ASSEMBLY FOR A RECIPROCATING MOWER

This application is a Continuation of application Ser. No. 08/841,703, filed Apr. 30, 1997.

BACKGROUND OF THE INVENTION

1. Field of the Invention:

The invention is directed to an improved end guard section for a cutterbar.

2. Description of the Prior Art:

A typical harvesting platform is provided with an elongated cutterbar assembly for cutting a standing crop. The cutterbar comprises a steel angle support bar, a series of sickle guards, a knifeback, a series of knives and a series of holddown clips. The sickle guards are mounted to the support bar. Each of the guards are provided with a channel in which the knifeback is slideably positioned. In addition, each guard is provided with a slot having ledger plates into which the knives are slideably positioned. A series of triangular knives are bolted to the knifeback. The holddown clips are bolted to the angle bar and extend forward over the knifeback into contact with the knives for holding the knives against the ledge plates of the sickle guards. The cutting edges of the knives and the ledger plates cooperate to shear the standing crop.

Traditionally the knife sections are secured to the knifeback by rivets. To facilitate field replacement of the knife sections, bolts are now used to secured the knives to the knifeback, as illustrated in U.S. Pat. No. 5,040,363. The knifeback is provided with a series of round holes through which the mounting rivets or bolts are inserted. The assembler needs full access to both sides of the knifeback to secure the knife sections to the knifeback. Strength of the hardware used in wider and wider platforms is becoming a problem due to the increased loads.

It should be noted that round headed square necked bolts, also known as carriage bolts, is known hardware.

Sickle guards are provided with a slot into which the knife sections are slideably received. The slot is provided with ledger plates which cooperate with the knife sections to cut the standing crop, see U.S. Pat. No. 3,844,095. Traditionally holddown clips are positioned between the sickle guards and are mounted to the support bar. An adjustment mechanism at the rear of the of the holddown clip controls the vertical position of the clip relative to the knife sections, see U.S. Pat. Nos. 4,012,891 and 4,644,738. U.S. Pat. No. 3,721,079 discloses a cutterbar having a holddown washer located directly behind the sickle guard. U.S. Pat. No. 5,617,712 discloses a sickle guard having a slot defined by an upper lip which is provided with a holddown screw for directly contacting the knife sections to hold them against the ledger plates.

Traditionally the left end of the knifeback is the drive end of the knifeback and is coupled to a wobble box which reciprocates the knifeback back and forth. The right end is the non-drive end and extends past the end of the machine.

SUMMARY

It is an object to the present invention to provide an improved cutterbar assembly having several new and advantageous features.

The knifeback is provided with a series of oval holes that extend in the transverse direction. Each of the mounting bolts for the knifeback are provided with oval necks that correspond to the oval holes in the knifeback. When the oval neck is in contact with the sidewalls of the oval hole, it prevents rotation of the mounting bolt as the nut is being tightened making assembly easier.

The sickle guard is provided with at least one guard having an upper lip defining the knife slot. The upper lip is provided with a adjustment screw for positioning a holddown clip relative to the knife sections. The rear of the holddown clip is mounted to the support bar and extends forwardly therefrom over the knifeback to be sandwiched between the upper lip of the guard and the knife sections. The adjustment screw in the upper lip contacts the forward end of the holddown clip for positioning it relative to the knife sections.

The non-drive end of the cutterbar is provided with a forged end guard section for enclosing the last knife section and supporting knifeback. The end guard section is provided with a body portion having a channel for receiving the knifeback, a mounting portion which is integral with the body portion is mounted to the support bar, a single guard which is integral with the body portion extends forwardly from the body portion, the body portion and the single guard define a slot for receiving a knife.

DETAILED DESCRIPTION

Figure 1:
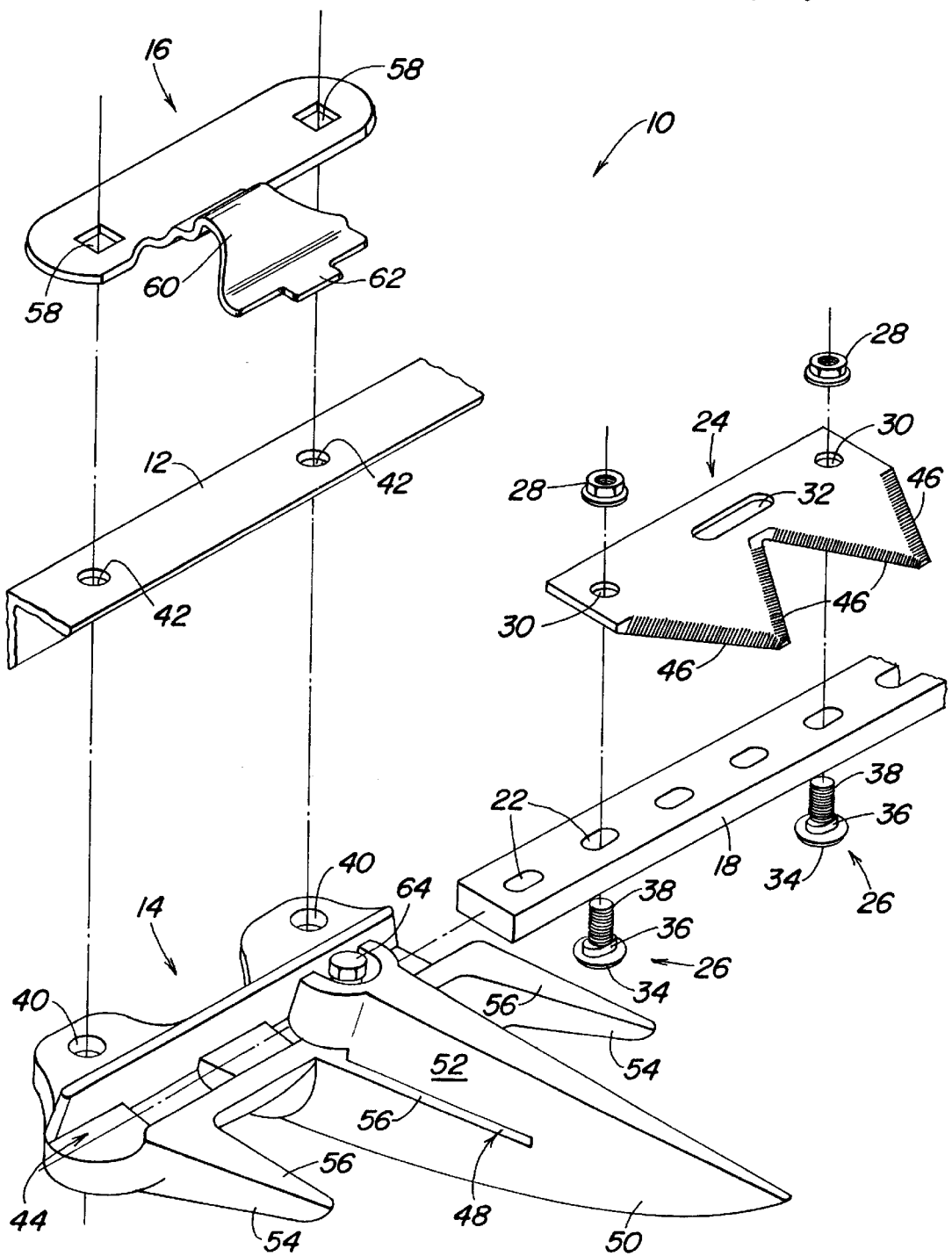
FIG. 1 is an exploded sectional view of the cutterbar of the present invention.
Figure 2:
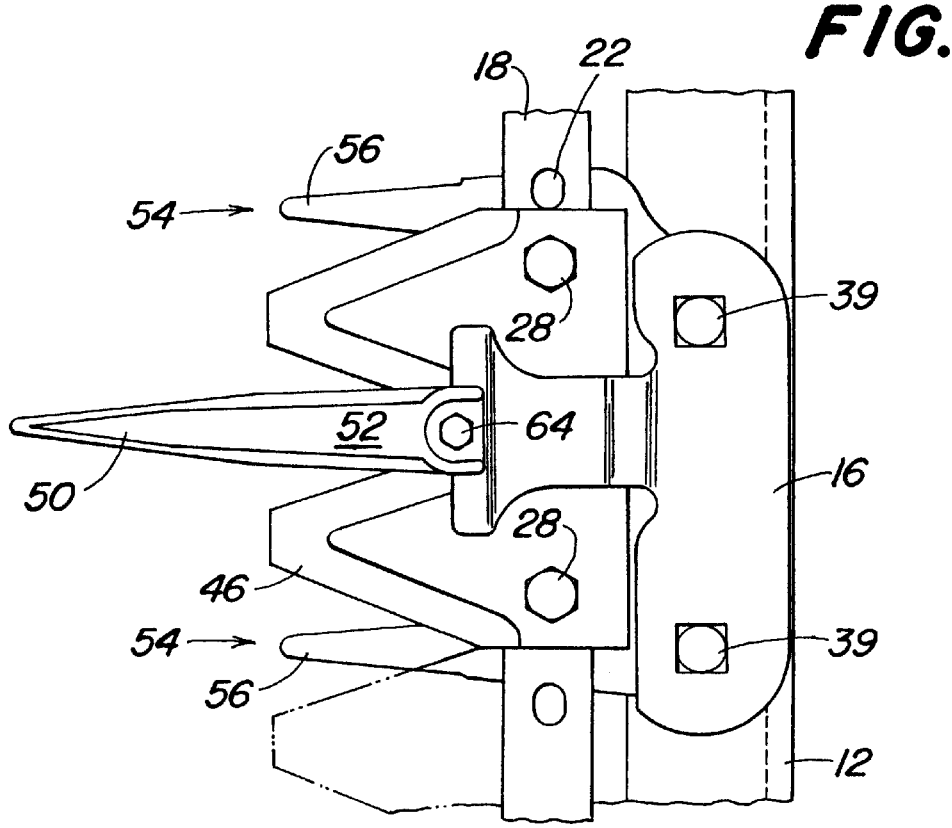
FIG. 2 is a top sectional view of the cutterbar of the present invention.
Figure 3:
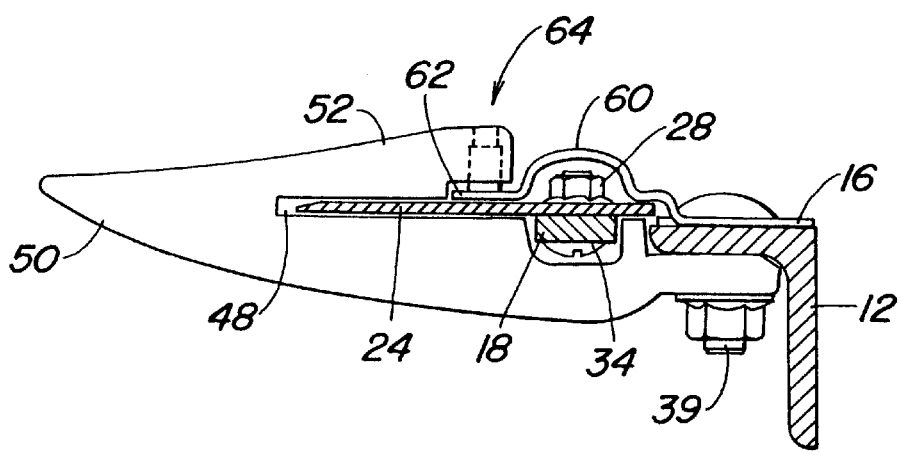
FIG. 3 is a cross sectional view of the cutterbar of the present invention.

FIG. 1 is an exploded view of a section of cutterbar 10. The section includes support bar 12 to which is mounted sickle guard section 14 and holddown clip 16. A knifeback 18 is slideably positioned in channel 44 formed in sickle guard section 14. The knifeback 18 is provided with a series of oval shaped mounting holes 22. The support bar 12 and the knifeback 18 extend in a transverse direction to the travel direction of the supporting machine. The oval shaped mounting holes 22 also extend in a transverse direction. A series of double knife sections 24, only one shown, are bolted to the knifeback by mounting bolts 26 and hexagonal nuts 28.

The double knife section 24 is provided with two mounting holes 30 and a mounting slot 32. Through most of the length of the knifeback 18 the double knife sections 24 are held in place on the bar by the two mounting bolts 26 passing through the oval shaped mounting holes 22 in the knifeback 18 and extending upward through mounting holes 30 in the double knife section 24. However at splice joints in the knifeback 18, of the kind illustrated in U.S. Pat. No. 5,040,363, four mounting bolts 26 would extend through four adjacent knifeback mounting holes 22 formed in the splice joint of the knifeback 18 and extend upwardly through both the mounting holes 30 and the mounting slot 32 of the double knife section 24. The oval shaped mounting holes 22 are formed by stamping oval holes in the knifeback 18.

The mounting bolts 26 are provided with a round head 34, an oval shaped neck 36 and a threaded shaft 38. The oval shaped neck 36 of the mounting bolts 26 corresponds to the oval shaped mounting holes 22. In assembling knife sections 24 to the knifeback 18, the assembler inserts mounting bolts upwardly through the knifeback 18 and the knife sections 24 so that the round head 34 bears against the knifeback and the threaded shaft extends upwardly past the knife section 24. The mating oval shaped mounting holes 22 and oval shaped necks 36 render the mounting bolts 26 stationary, so that as the hexagonal nut is screwed onto the threaded shaft 38 of the mounting bolt 26 the assembler only has to torque nuts 28.

The sickle guard section 14 is mounted to the support bar 12 by two mounting bolts 39, not shown in FIG. 1, which pass through holes 40 in the sickle guard section 14 and holes 42 in the support bar 12. The sickle guard section 14 is provided with a channel 44 into which the knifeback 18 is slideably received. The serrated edges 46 of the double knife section 24 extend forwardly from the knifeback 18 and slideably move through slot 48 formed in guard 50. Guard 50 is provided with an upper fixed lip 52 which defines the roof of the slot 48. The guard is flanked by two blade supports 54. The guard 50 and both blade supports 54 are provided with ledger surfaces 56 which cooperate with the serrated blade 46 of the knife section 24 to cut standing crop material. It should be noted that the sickle guard sections flanking the illustrated guard section would comprise two guards located at its transverse ends and one blade support located between the guards.

To maintain proper cutting action it is important for the knife section to maintain contact with the ledger surfaces. Holdown clip 16 bears against the top surface of the knife section 24 to keep it in contact with the ledger surfaces 56. The holdown clip 16 is formed from sheet metal and is mounted to the support bar 12 by the same mounting bolts 39 that secure the guard section 14 to the support bar 12. The mounting bolts passing through holes 58 located in the rear of the clip 16. The clip 16 extends forwardly therefrom towards the guard 50. The clip 16 has an arched portion 60 that extends over the knifeback 18. The forward portion of the clip 16 is provided with a tongue 62 that extends into slot 48 between the upper lip 52 and the knife section 24. Adjustment bolt 64 is screwed into the upper lip 52 and extends therethrough to form an assembly for adjusting the vertical position of the clip 16. By rotating the adjustment screw 64 the operator can force the clip downwardly so that it makes correct contact with the top of the knife section. An important feature of this design is that the holdown clip 16 is in line with the guard 50 thereby minimizing crop flow over the cutterbar 10.

Figure 4:
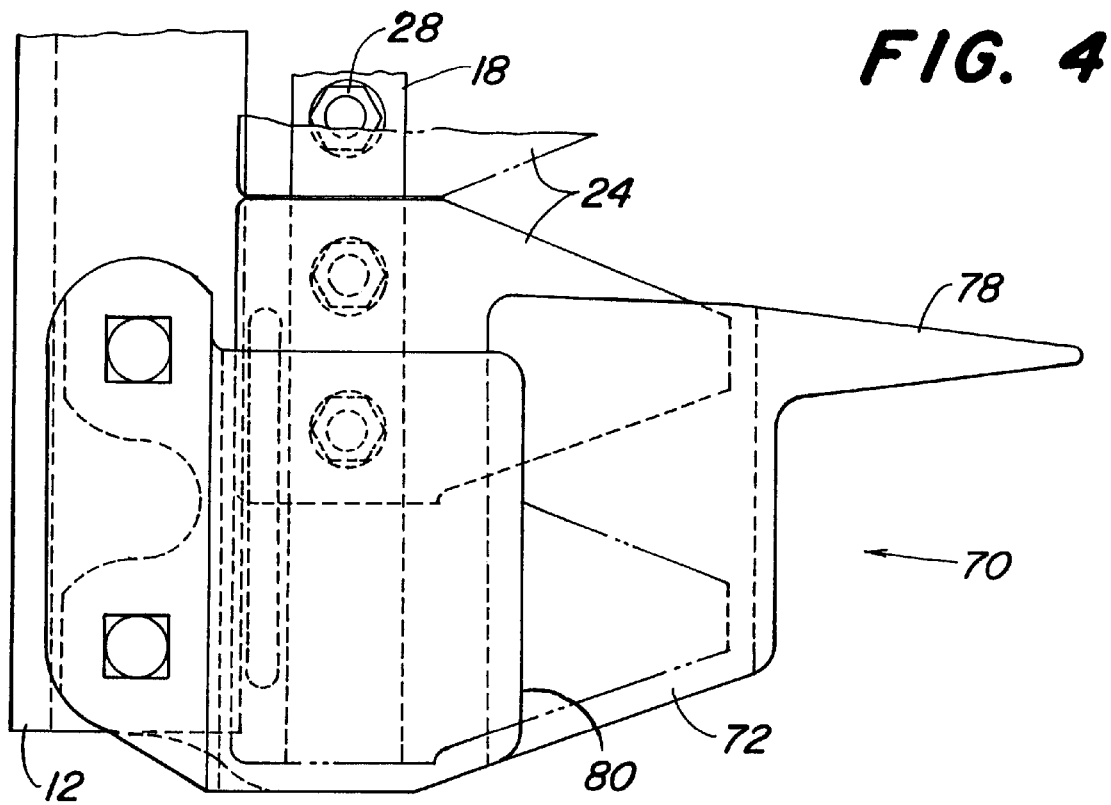
FIG. 4 is a top view of the end guard section.
Figure 5:
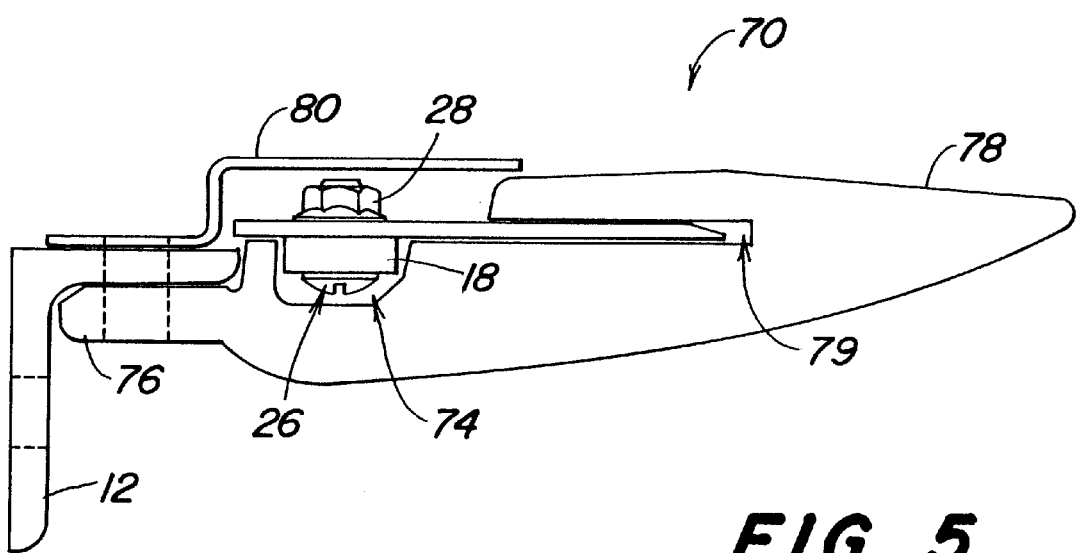
FIG. 5 is a cross sectional view of the end guard section

FIGS. 4 and 5 are directed to a specialized end guard section 70 used on the non-drive side of the cutterbar 10. Guard section 70 is an integral forging comprising a body portion 72 having a channel 74 for receiving the knifeback 18, a mounting portion 76 extending rearwardly from the body portion 72 for mounting the guard section 70 to the support bar 12, and a single guard 78 extends forwardly from the body portion 72. The body portion 72 and the single guard 78 define a slot 79 for receiving an end knife section 24. The body portion 72 forms an enclosed area in which the knife section 24 can be reciprocated back and forth. A forwardly extending cover 80 is mounted to the support bar and guard section 70 by the same mounting bolts.

The present invention should not be limited by the above described embodiments, but should be limited solely by the claims that follow.

I claim:

1. An end guard for a cutterbar assembly, the end guard comprising:

a body portion having a channel for receiving a knifeback, a mounting portion which is integral with the body portion extends rearwardly from the body portion for mounting the end guard to a support bar;

a single guard which is integral with the body portion extends forwardly from the body portion;

wherein the body portion and the single guard define an enclosed area for enclosing a full knife and a forwardly extending cover is mounted to the mounting portion and extends over the body portion.

* * * * *